United States Patent
Kirchen et al.

(10) Patent No.: US 6,804,864 B2
(45) Date of Patent: Oct. 19, 2004

(54) FASTENER FOR PRE-ASSEMBLING WORK PIECES

(75) Inventors: James T. Kirchen, Chippewa Falls, WI (US); James S. Tisol, Jr., Chippewa Falls, WI (US)

(73) Assignee: Illinois Tool Works Inc., Glenview, IL (US)

( * ) Notice: Subject to any disclaimer, the term of this patent is extended or adjusted under 35 U.S.C. 154(b) by 61 days.

(21) Appl. No.: 10/114,813

(22) Filed: Apr. 3, 2002

(65) Prior Publication Data

US 2003/0190965 A1 Oct. 9, 2003

(51) Int. Cl.[7] .......................... A44B 17/00; B60R 21/16; F16B 21/00
(52) U.S. Cl. ............................. 24/297; 24/289; 24/295; 24/662; 411/508; 411/510
(58) Field of Search .......................... 24/297, 295, 289, 24/662; 411/389, 106, 508, 339, 551, 510, 517; 292/251

(56) References Cited

U.S. PATENT DOCUMENTS

| | | | | | |
|---|---|---|---|---|---|
| 3,860,999 | A | * | 1/1975 | Meyer | 411/510 |
| 4,276,806 | A | * | 7/1981 | Morel | 411/41 |
| 4,616,953 | A | * | 10/1986 | Gomes | 411/510 |
| 4,778,320 | A | * | 10/1988 | Nakama | 24/297 |
| 4,920,618 | A | * | 5/1990 | Iguchi | 24/297 |
| 5,509,182 | A | * | 4/1996 | Nakanishi | 24/297 |
| 6,334,750 | B1 | * | 1/2002 | Hsieh | 411/508 |
| 6,431,585 | B1 | * | 8/2002 | Rickabus et al. | 280/728.1 |
| 6,496,372 | B1 | * | 12/2002 | Davison et al. | 24/297 |

* cited by examiner

Primary Examiner—Victor Sakran
(74) Attorney, Agent, or Firm—Mark W. Croll; Paul F. Donovan

(57) ABSTRACT

A fastener for securing a first object such as a headliner to a second object such as the interior of an aircraft or automobile which is also capable of being pre-assembled with the first object in a predetermined orientation is disclosed. A fastener constructed and arranged according to the present invention has an upper head from which extends a shank having a shank fastener formed therein for securing the retainer into a bore formed in the second object. At least one pre-assembly leg is secured to the shank at a predetermined offset distance from the head. A lower head having a bore formed therethrough so that it may be received over the shank of the fastener is secured to a distal end of the at least one pre-assembly leg and actuates the pre-assembly leg so as to double the pre-assembly leg upon itself and simultaneously bias it into contact with the first object, thereby securing the fastener within a bore formed through the first object in the predetermined orientation.

27 Claims, 5 Drawing Sheets

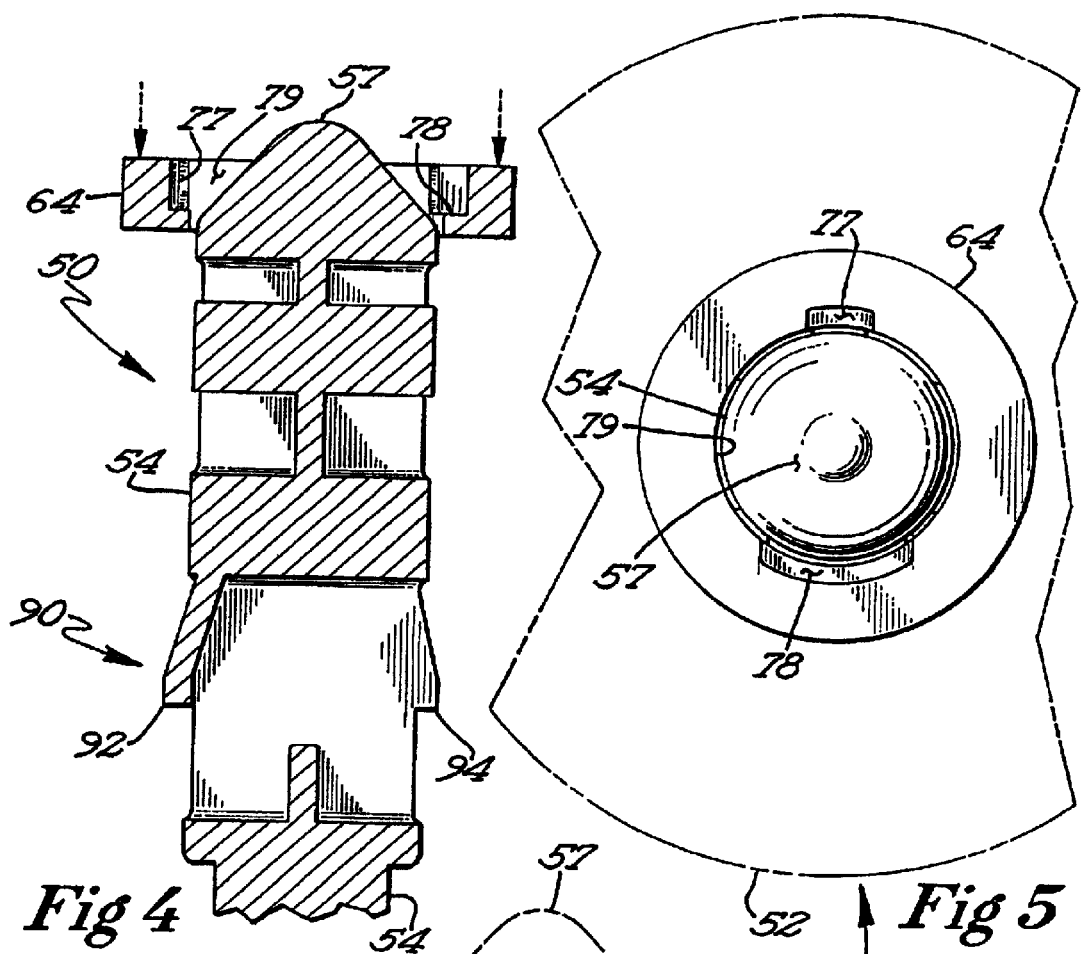
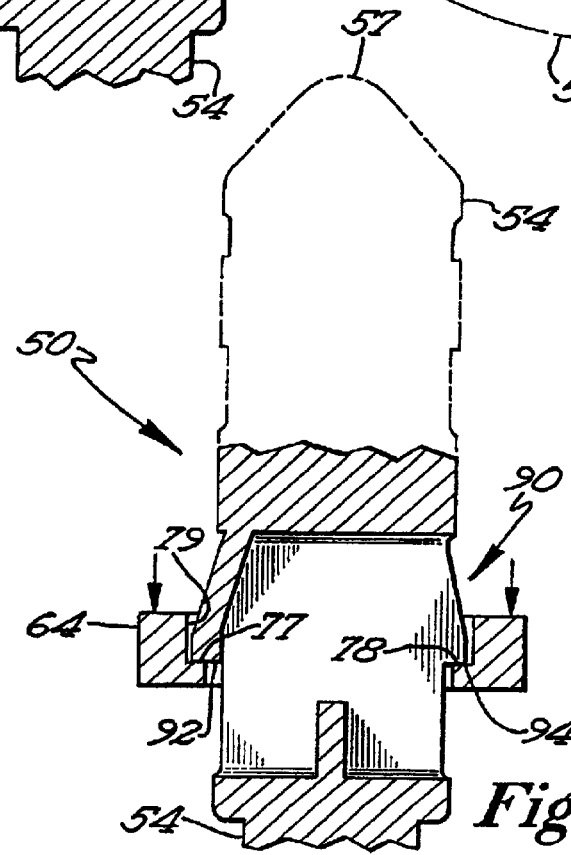

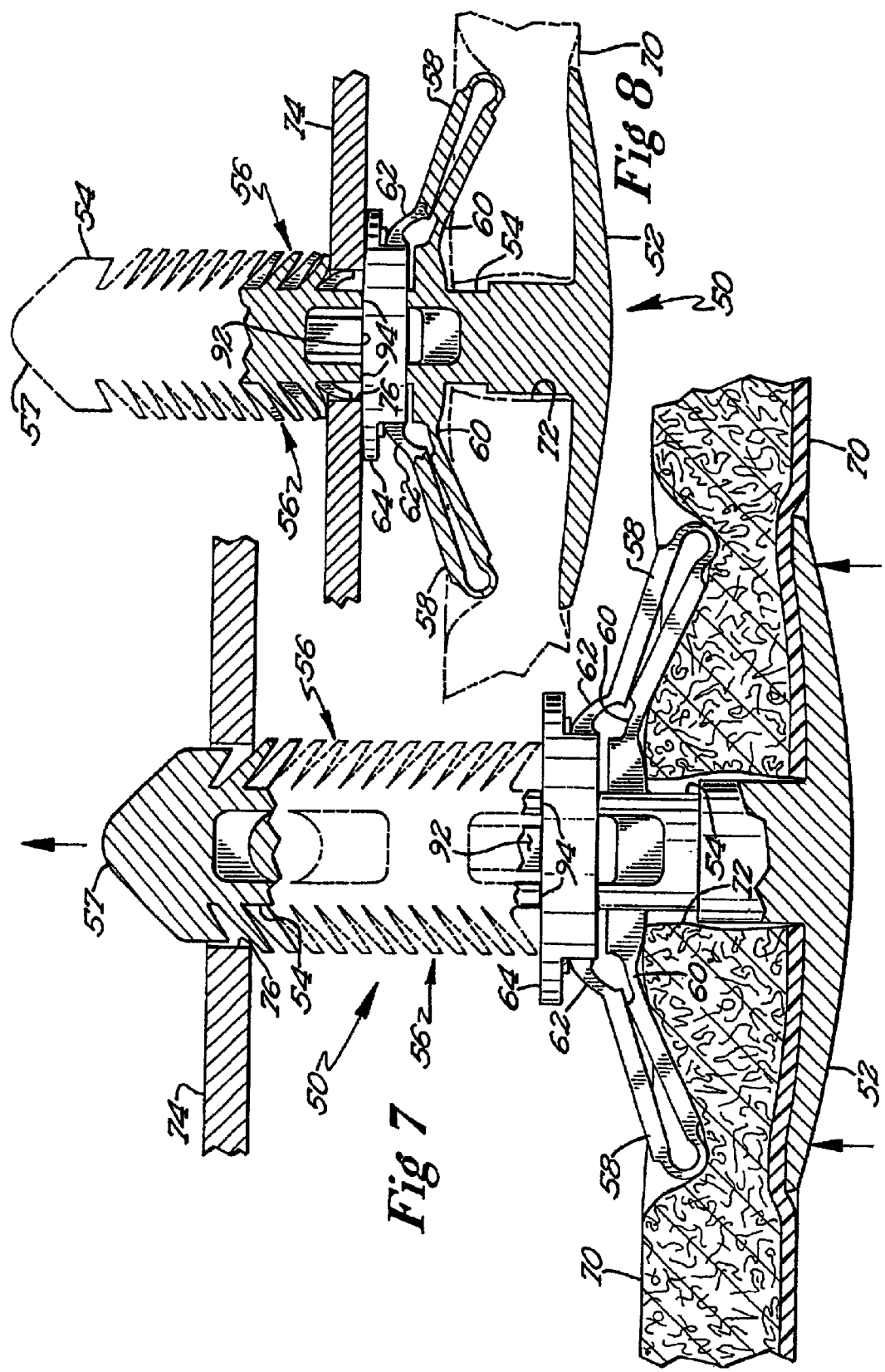

FASTENER FOR PRE-ASSEMBLING WORK PIECES

FIELD OF THE INVENTION

The present invention relates to a fastener that is constructed and arranged for pre-assembly with a first object, typically a panel or the like, that will later be secured to a second object, often a structural member of the interior of an aircraft or an automobile.

BACKGROUND OF THE INVENTION

A typical fastener used in the aircraft and automobile industries for fastening panels such as a headliner panel into the interior of an aircraft or an automobile is illustrated in FIG. 1 at 10. The prior art fastener 10 is comprised of a large, mushroom-shaped head 12 and has a shank 14 extending from the underside thereof. A shank fastener 16 is formed into the shank 14 and provides the means whereby fastener 10 may secure a first object 20 to a second object 22. The first object, in this instance a headliner panel for an aircraft or automobile, has a bore 24 formed therethrough that is sized to permit the shank 14 of the fastener 10 to pass therethrough. The shank 14 is subsequently inserted into a bore 26 formed through the second object 22, in this case the sheet metal structural member of the interior of an aircraft or automobile. The shank fastener 16 ensures that the fastener 10 cannot be removed from the bores 24 and 26. In this manner, a headliner panel for an aircraft or automobile may be rapidly and easily emplaced.

It is often the practice that various sub-assemblies, such as the headliner panel described above, are manufactured at a location remote from that at which the aircraft or automobile is itself assembled. In this case the sub-assembly is brought to the location where the aircraft or automobile is being assembled and is emplaced at the appropriate time. To facilitate this process wherein parts are manufactured remote from a main assembly location, it is desirable to pre-assemble certain structures such as the headliner panel described above. However, fasteners 10 of the type illustrated in FIG. 1 are not susceptible of pre-assembly with a panel structure as illustrated. Specifically, the shank fastener 16 is not typically formed in a fashion that would retain the fastener 10 in the bore 24 formed in the panel 20. Consequently, the fasteners 10 would most likely work their way out of a bore 24 on their own prior to assembly. In order to permit the pre-assembly of structures such as a headliner panel, small retaining structures have been added to fasteners 10 in order to retain the fasteners in a bore 24 formed through a headliner panel 20 or the like. These retaining structures typically comprise such things as the whiskers 30 illustrated in FIG. 2a or the flexible wings 32 illustrated in FIG. 2b.

While the retaining structures 30, 32 illustrated in FIGS. 2a and 2b are sufficient to secure a fastener 10' or 10" within a bore 24 formed in a sub-assembly 20 such as a headliner panel, the structures are less than ideal in that the fasteners 10' and 10" have a tendency to be very loosely held in the bore 24 formed through the sub-assembly 20. This results in difficulty in aligning a fastener 10', 10" so that it can be inserted into a bore 26 formed in a second object 22. This inability to align the fasteners 10, 10', and 10" can result in increased assembly time and even in broken or lost fasteners.

Accordingly, it is a feature of the present invention to provide a fastener that can be securely and rapidly pre-assembled with a first object such as a headliner panel of an aircraft or an automobile. It is another feature of the present invention to provide a fastener that, once pre-assembled with a first object, remains within a predefined deviation from a predetermined geometric orientation, preferably perpendicular, with the first object. A last feature of the present invention is to provide a method for assembling a first object with a second object that includes the use of a fastener that can be rapidly and securely pre-assembled with the first object in a location remote from the location where the first and second objects are to be assembled, and wherein the fastener maintains a predetermined geometric relationship with the first object to permit the rapid assembly of the first object with the second object.

These and other features and advantages of the invention will appear more fully from the following description, made in conjunction with the accompanying drawings wherein like reference characters refer to the same or similar parts throughout the several views.

SUMMARY OF THE INVENTION

The benefits of the present invention are realized in a fastener that comprises at least one pre-assembly leg constructed and arranged to compress a first object between a head of the fastener and the pre-assembly leg. A fastener according to the present invention has a head from which extends a shank having a typical shank fastener for securing the fastener within a bore in a second object. The pre-assembly leg is secured to the shank at a predetermined offset distance from the head and is secured to a lower head at its distal end. The lower head a bore formed therethrough that allows the lower head to be received over the shank and move between a first position located adjacent the tip of the shank and a second position in which the lower head is located adjacent the upper end of the pre-assembly legs. Note that while it is preferred to utilize two pre-assembly legs the present invention may accommodate any useful number. A retaining structure comprised of a combination of flexible tabs and/or catches formed into the shank and extending laterally therefrom is used to retain the lower head in its second position.

It is preferred to construct and arrange the pre-assembly legs such that when the lower head is in its second position, the pre-assembly legs will be biased against a first object through which the fastener has been inserted. However, it is to be understood that the assembly legs may be positioned substantially perpendicular to the shank of the fastener or even biased away from the first object when the lower head is in its second position as required. Note also that, while the pre-assembly arms are preferably folded into their actuated position, the pre-assembly legs may also be bent into a bow or loop shape as well. In any case, the pre-assembly arms act to maintain the fastener in a predetermined geometric relationship with the first object.

In use, the fastener of the present invention is part of a method of assembling a first object to a second object. A first step in this method is to provide a fastener that is constructed and arranged according to the principles of the present invention. The shank of this fastener is then inserted into a bore formed through the first object such that the upper head of the fastener is in contact with the first side of the first object. The lower head of the fastener is then moved from its first position to its second position so as to actuate the pre-assembly legs into a position that retains the fastener of the present invention within the bore formed in the first object. Subsequent to this pre-assembly, the first object, having fasteners of the present invention pre-assembled therewith, is brought to the main assembly location where the first object is aligned with a second object to which it is to be secured. The shank of each of the fasteners of the present invention is then forced into a bore formed into the second object such that the shank fastener will secure each one of the fasteners within that bore in the second object.

DESCRIPTION OF THE DRAWINGS

FIG. 4 is a partial cross-sectional side view of the fastener of FIG. 3;

FIG. 5 is an end view of a fastener according to the present invention looking down the shank toward the head of the fastener;

FIG. 6 is a cross-sectional cutaway view of the shank of the fastener of the present invention illustrating the lower head in its second position;

FIG. 7 is a cross-sectional side view of the fastener of FIG. 3 that has been pre-assembled with a first object;

FIG. 8 is a cross-sectional side view of the fastener of FIG. 7 wherein the fastener has secured a first object to a second object; and, FIGS. 9 and 10 are partial side views of alternate embodiments of a shank fastener.

DETAILED DESCRIPTION

Although the disclosure hereof is detailed and exact to enable those skilled in the art to practice the invention, the physical embodiments herein disclosed merely exemplify the invention, which may be embodied in other specific structure. While the preferred embodiment has been described, the details may be changed without departing from the invention, which is defined by the claims.

Figure 1:
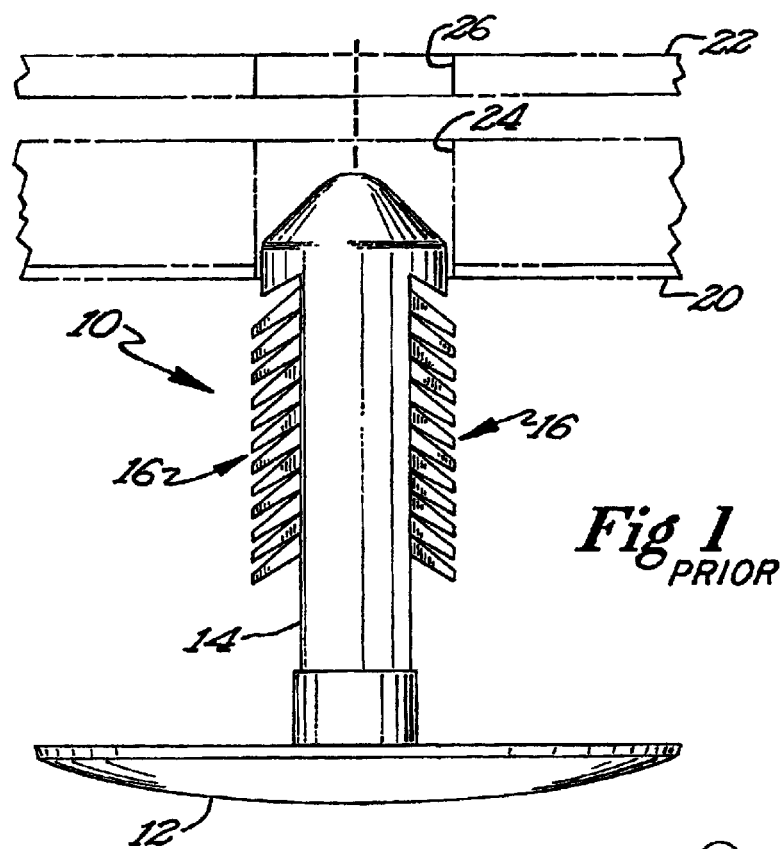
FIG. 1 is an illustration of a prior art fastener.
Figure 2A:
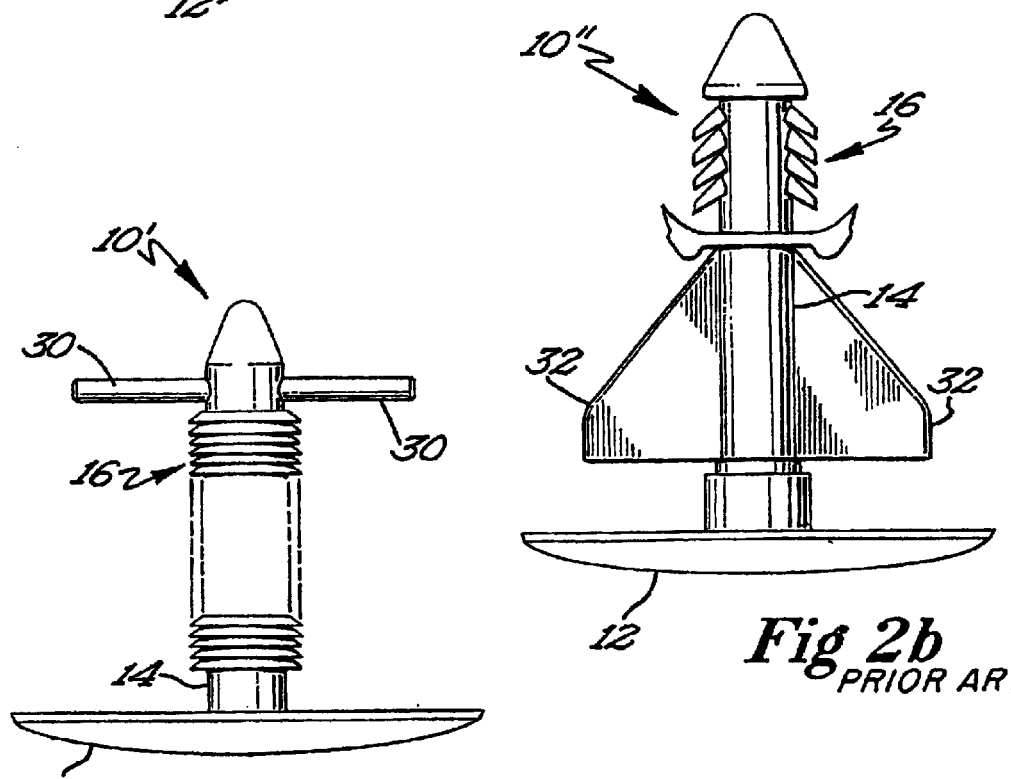
FIG. 2a is a prior art fastener having a pair of whiskers extending from the tip thereof.
Figure 2B:
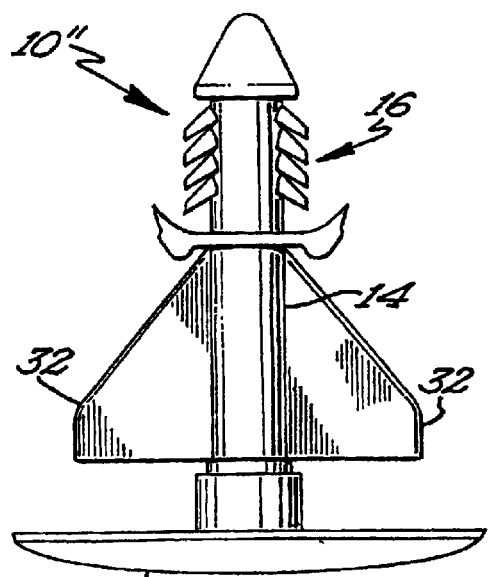
FIG. 2b is a prior art fastener having a pair of flexible wings extending therefrom.
Figure 3:
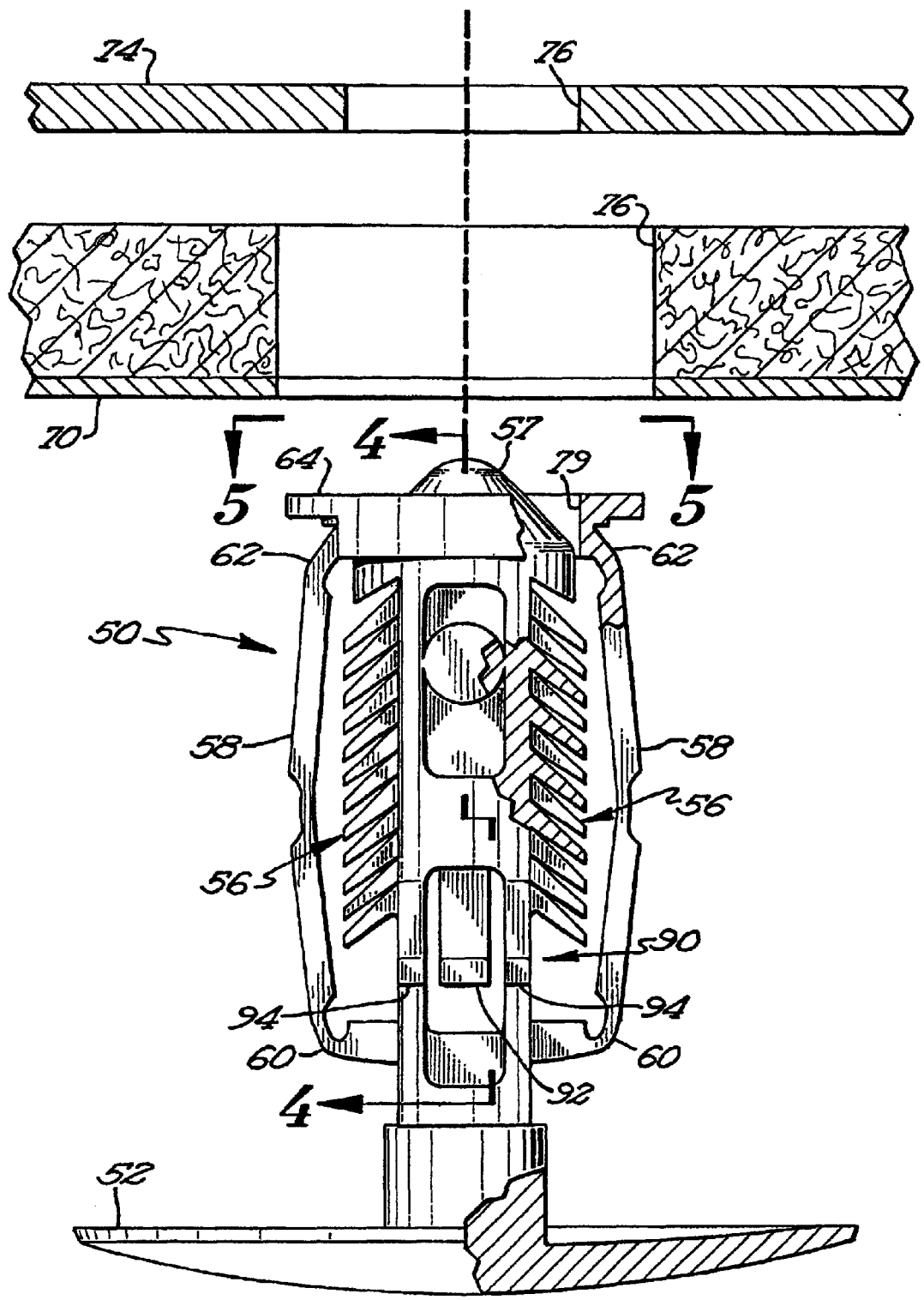
FIG. 3 is a partial cross-sectional side view of a fastener of the present invention including a pair of pre-assembly legs.

FIG. 3 illustrates a fastener 50 according the present invention. Fastener 50 comprises a large, mushroom-shaped head 52 from which extends a shank 54. A shank fastener 56 functions to lock the fastener 50 into its final position as described more particularly hereinbelow. The fastener 50 also comprises one or more pre-assembly legs 58. These pre-assembly legs 58 are attached at their ends 60 to the shank 54 of the fastener 50. The lower end 62 of the pre-assembly leg 60 is attached to a lower head 64. This lower head 64 is generally of an annular shape and is constructed and arranged to be received over the shank 54, including the shank fastener 56. In FIG. 3, the lower head 64 is illustrated in its first position. While in this position, the fastener 50 may be inserted into a bore 72 formed through a first object 70.

Throughout this specification, the terms "first object" and "second object" are used to refer generically to distinct objects that may be connected to one another through the use of a fastener 50 of the present invention. It is to be understood that while the preferred embodiment of the present invention is adapted for use in the aircraft and automobile industries, specifically with regard to the installation of headliner panels in such vehicles, a fastener 50 may be readily adapted for use in diverse applications other than the aircraft or automobile industries. The present invention is therefore not to be limited to only those applications disclosed in this specification.

As can be seen in FIGS. 7 and 8, the pre-assembly legs 58 will, in conjunction with the relatively large head 52 of the fastener 50, securely clamp the first object 70 therebetween. By positioning the pre-assembly legs 58 in the position illustrated in FIG. 7, it is a simple matter to pre-assemble the fastener 50 with the first object 70 at the location where the first object 70 is manufactured or produced. The lower head 64, because it is secured to a lower end 62 of the pre-assembly legs 58, actuates the pre-assembly legs 58 between their position illustrated in FIG. 3 and that illustrated in FIG. 7 when the lower head 64 is moved from its first position as illustrated in FIG. 3 to its second position as illustrated in FIGS. 6, 7 and 8.

In one embodiment, the pre-assembly legs are constructed and arranged to be folded or doubled over into the position shown in FIGS. 7 and 8. While this embodiment is a preferred one for the present invention, it is contemplated that the pre-assembly legs 58 may ultimately be constructed and arranged so as to be positioned in a number of ways, including perpendicular to the shank 54 or even in a position in which the pre-assembly legs 58 are biased away from the first object 70. Furthermore, it is not strictly necessary for the pre-assembly legs 58 to be folded or doubled over as illustrated. A relatively thin pre-assembly arm 58 not having a predefined bend point would form a loop or bow structure that would also act to retain the fastener 50 in a pre-assembly with a first object 70. It is to be understood that the pre-assembly arms may have any useful shape or construction that will permit, upon actuation by the lower head 64, the pre-assembly of the fastener 50 incorporating the pre-assembly legs 58 with the first object 70. Accordingly, the structure of the pre-assembly legs is not to be limited to those structures disclosed herein.

Referring to FIGS. 3–6, it can be seen that the lower head 64 may be generally annular in shape and has a bore 79 formed therethrough that allows the lower head 64 to be received over the shank 54 of the fastener 50. Note that the bore 79 must also be sufficiently large in diameter to be received over the shank fastener 56 that is typically formed as part of the shank 54. FIGS. 4–6 illustrate a preferred embodiment of a retaining mechanism useful for securing the lower head 64 in its second position. A retaining mechanism 90 can comprise one or more flexible fingers 92 or catches 94. However, in the preferred embodiment, the retaining mechanism 90 will comprise a single flexible finger 92 and two catches 94. A flexible finger 92 is a small flexible tab that extends somewhat laterally from the shank 54 of the fastener 50. As the fasteners 50 are typically molded from a plastic material, a relatively small, cantilevered tab that forms the flexible finger 92 is somewhat pliable. As the lower head 64 is moved from its first position to its second position (compare FIGS. 4 and 6), the interior surface of the bore 79 formed through the lower head 64 will act to push or bias the flexible finger 92 out of the path of travel of the lower head 64. Once the lower head 64 has moved to its second position as illustrated in FIG. 6, the flexible finger 92 will snap back into its original position and will engage a notch 77 formed into the interior surface of the bore 79 of the lower head 64.

The catch or catches 94 are typically formed into the shank 54 of the fastener opposite the flexible finger 92. The catches 94, like the flexible finger 92, extend laterally from the shank 54 and into the path of travel of the lower head 64.

As the lower head 64 moves from its first position to its second position, the catches 94, although somewhat rigid, allow the lower head 64 to pass thereover. Once the lower head 64 has moved to its second position, the lower head will engage the catches 94 in a second notch 78. Between the actions of the flexible finger 92 and the catches 94, the lower head 64 is securely retained in its second position as illustrated in FIG. 6. The action of the flexible finger 92 and catches 94 in maintaining the lower head 64 in its second position also act to maintain the pre-assembly arms 58 in their doubled attitude as illustrated in FIGS. 7 and 8.

Note that the flexible finger 92 and the catches 94 perform basically the same function. While in the preferred embodiment of the present invention the retaining mechanism 90 comprises a flexible finger 92 with one or more catches 94 formed opposite the flexible finger, it is to be understood that any combination of flexible fingers 92 and catches 94 may be utilized. In addition, additional structures such as a beveled circumferential ridge formed around the shank 54 may also act to retain the lower head in its second position. Accordingly, the structure of the retaining mechanism 90 is not to be limited to the specific embodiments disclosed in this specification.

FIG. 7 illustrates a fastener 50 that has been pre-assembled with the first object 70. FIG. 7 also illustrates how the pre-assembled fastener 50 and first object 70 are subsequently connected to a second object 74. To secure the first object 70 to the second object 74, the shank 54 of the fastener 50 is inserted into a bore 76 formed through the second object 74. Where the fastener 50 of the present invention is utilized to install a headliner into the interior of an aircraft or an automobile, the second object 74 will often be a sheet metal frame member of one of those vehicles. However, it is to be understood that a second object 74, rather than being relatively thin, as would the sheet metal frame member of an automobile or aircraft, could be a solid structural member or other structure having a bore with a depth greater than the length of the shaft 54.

As can be appreciated from FIGS. 7 and 8, as the shank 54 of the fastener 50 is inserted into the bore 76 and the second object 74, the shank fastener 56 will engage the interior of the bore 76 so as to securely retain the shank 54 therein. In this manner, a headliner or other similar structure may be quickly and simply installed in its desired position. FIGS. 7 and 8 show the lower head 64 in its second position wherein the pre-assembly legs 58 are folded or doubled such that the legs 58 are biased into contact with the first object 70.

The use of a fastener 50 constructed and arranged according to the present invention allows a first object 70 such as a headliner for an automobile to be pre-assembled with the fasteners in place at a location remote from where an automobile is being assembled. This, in turn, facilitates more efficient manufacturing processes such as Just In Time (JIT) manufacturing. In use, a first object or headliner 70 having bores 72 formed therethrough is pre-assembled with the fasteners 50. This pre-assembling step involves inserting the shank 54, including the lower head 64 and pre-assembly legs 58 through the bore 72 formed through the headliner. It is to be understood that the distance between the upper end 60 of the pre-assembly legs 58 and the undersurface of the head 52 of the fastener is specifically gauged to the thickness and resiliency of the first object 70. Where the first object 70 is relatively rigid, the standoff distance formed between the upper end 60 of the pre-assembly legs and the undersurface of the head 52 will be substantially the same as or slightly larger than the thickness of the first object 70. Where the first object 70 is relatively pliable, the standoff distance between the undersurface of the head 52 and the upper end 60 of the pre-assembly legs 58 will generally be the same as or slightly smaller than the thickness of the first object 70. Alternatively, and where appropriate, the standoff distance defined between the upper end 60 of the pre-assembly legs and the undersurface of the head 52 may be greater than the thickness of a relatively pliable first object 70.

Once the fastener 50 has been inserted into the bore 72 such that the undersurface of the head 52 of the fastener is in substantially full contact with the upper surface of the headliner 70, the lower head 64 is actuated from its first position as illustrated in FIG. 3 to its second position as illustrated in FIGS. 6, 7 and 8. In doing so, the pre-assembly legs 58 are bent upwardly into a doubled or folded attitude in which the pre-assembly arms 58 compress the headliner 70 against the undersurface of the head 52 of the fastener. As the lower head 64 moves to its second position, the flexible finger 92 and the catches 94 engage the notches 77 and 78, respectively, thereby retaining the lower head 64 in its second position. The headliner 70 is now pre-assembled with the fastener 50.

Note that the fastener 50 is not held rigidly in place when pre-assembled with the first object. Specifically, it is important that the fastener 50 retain some "float", i.e. be permitted to move laterally within the bore 72 formed in the first object 70. This facilitates the alignment of the fastener 50 with the bore 76 of the second object 74. It is preferred however that the fastener 50 not be loose in the bore 76.

The action of the pre-assembly arms 58 against the first object 70 also act to maintain the fastener 50 in a predetermined geometric relationship with the first object 70. In the preferred embodiment of the present invention, the fastener 50 is maintained in a substantially perpendicular relationship to the headliner or first object 70. As the tip 57 of the shank 54 is generally rounded or tapered so as to account for some degree of misalignment between the shank 54 and a bore 76 formed through the second object 74, it is not critical that the shank 54 of the fastener be perfectly perpendicular to the first object 70. The pre-assembly leg's 58 ability to maintain a fastener 50 in a particular attitude and to allow for a beneficial degree of "float", ensures the rapid and sure alignment of the fasteners 50 with the bore 76 formed in the second object 74.

Figure 9:
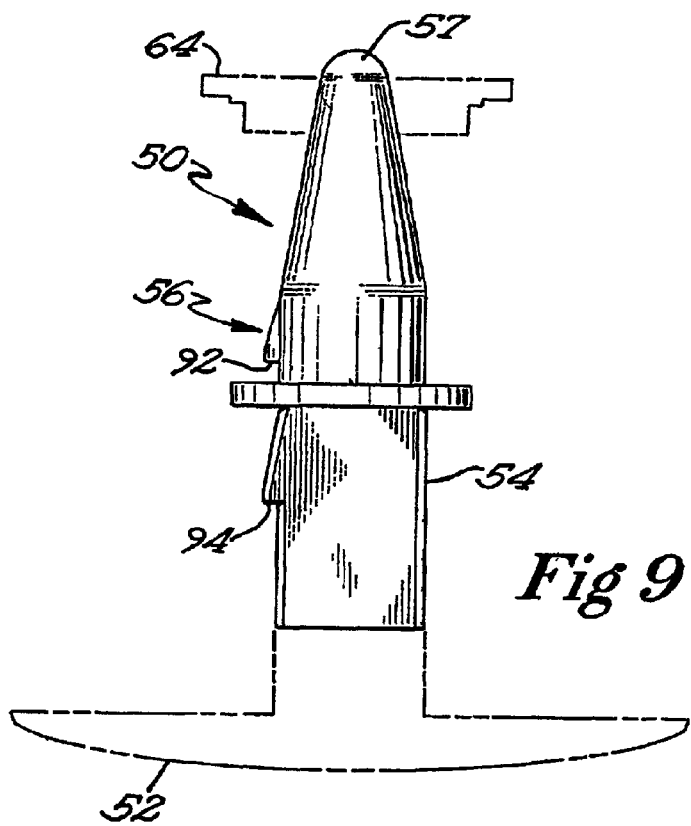
Figure 10:
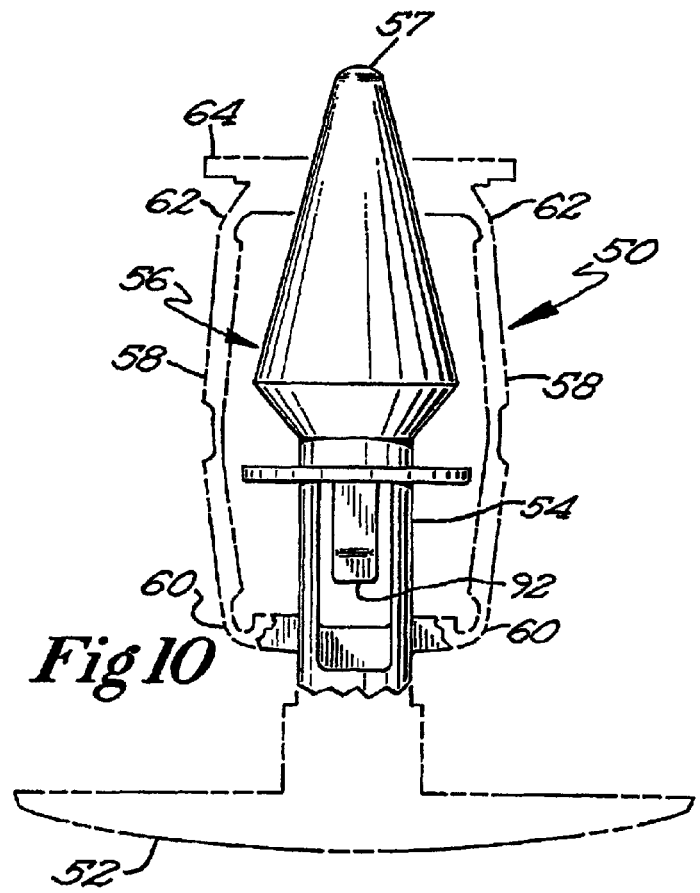

The pre-assembled headliner 70 is next brought together with the automobile into which it will be installed and is aligned with the automobile such that the shanks 54 of the respective fasteners 50 are substantially aligned with the bores 76 formed through the structural members 74 of the automobile. Then, as described above, the shank 54 of each fastener 50 is forced into a bore 76 formed in the structural member 74 of the automobile. The fastener 50 is forced into the bore 76 until the lower surface of the lower head 64 contacts the upper surface of the structural member or second object 74. The shank fastener 56 acts to retain the fastener 50 in this position. Various forms of shank fasteners may be utilized with the fastener 50 of the present invention. See FIGS. 9 and 10. Accordingly, any shank fastener 56 capable of performing the function described hereinabove is considered to be within the scope of the present invention.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A retainer for securing a first object to a second object, the retainer being constructed and arranged for pre-assembly with the first object, the retainer comprising:
   an upper head from which extends a shank, the shank having a shank fastener for securing the retainer in a bore formed in the second object;
   at least one pre-assembly leg, a first end of the at least one pre-assembly leg being secured to the shank of the retainer a predetermined distance from the upper head thereof;
   a lower head constructed and arranged to be received over the shank, the lower head being secured to a second end of the at least one pre-assembly leg, the lower head being moveable along the shank of the retainer between a first position adjacent a distal end of the shank and a second position located a predetermined distance from the upper head, the movement of the lower head from its first position to its second position being sufficient to cause the at least one pre-assembly leg to extend generally laterally from the shank, the first object being captured between the upper head and the at least one pre-assembly leg, and the second object being captured between the lower head and the shank fastener.

2. The retainer of claim 1 wherein the predetermined distance between the upper head and the first end of the pre-assembly leg is sufficient to position the upper head and the first end of the pre-assembly leg on opposing sides of a bore formed through the first object when the shank of the retainer is inserted into the bore formed in the first object.

3. The retainer of claim 1 further comprising a retaining mechanism for maintaining the lower head in its second position with respect to the shank.

4. The retainer of claim 3 wherein the retaining mechanism comprises a flexible finger extending laterally from the shank such that as the lower head moves to its second position, the flexible finger is temporarily deflected out of the path of travel of the lower head only to return to its initial position once the lower head has achieved its second position, thereby retaining the lower head in its second position.

5. The retainer of claim 3 wherein the retaining mechanism comprises a catch that extends laterally from the shank of the retainer so as to at least partially block the path of travel of the lower head in its movement to its second position, the lower head and the catch being constructed and arranged such that the lower head may be forced past the catch into its second position, the catch acting to maintain the lower head in its second position.

6. The retainer of claim 4 further comprising at least one catch that extends laterally from the shank of the retainer so as to at least partially block the path of travel of the lower head in its movement to its second position, the lower head and the catch being constructed and arranged such that the lower head may be forced past the catch into its second position, the catch acting to maintain the lower head in its second position.

7. The retainer of claim 1 further comprising at least two pre-assembly legs.

8. The retainer of claim 1 wherein the at least one pre-assembly leg is folded near the middle of its length when the lower head is in its second position.

9. The retainer of claim 8 wherein the at least one pre-assembly leg is biased against the first object when the lower head is in its second position.

10. The retainer of claim 1 wherein the at least one pre-assembly leg is bowed near the middle of its length when the lower head is in its second position.

11. The retainer of claim 10 wherein the at least one pre-assembly leg is biased against the first object when the lower head is in its second position.

12. The retainer of claim 1 wherein the at least one pre-assembly leg is biased against the first object when the lower head is in its second position.

13. The retainer of claim 1 wherein the at least one pre-assembly leg extends substantially perpendicular to the shank of the retainer when the lower head is in its second position.

14. The retainer of claim 1 wherein the at least one pre-assembly leg is biased away from the first object when the lower head is in its second position.

15. The retainer of claim 1 wherein the retainer is inserted into a bore formed through the first object and secured therein by moving the lower head to its second position in which the at least one pre-assembly leg extends laterally from the shank to a degree sufficient to retain the retainer within the bore formed through the first object.

16. A retainer for securing a first object to a second object, the retainer being constructed and arranged for pre-assembly with the first object, the retainer comprising:
   an upper head from which extends a shank, the shank having formed therein a shank fastener for securing the retainer in a bore formed in the second object;
   at least two pre-assembly legs, a first end of each of the at least two pre-assembly legs being secured to the shank of the retainer a predetermined distance from the upper head thereof;
   a lower head constructed and arranged to be received over the shank, the lower head being secured to a second end of the at least two pre-assembly legs, the lower head being moveable along the shank of the retainer between a first position adjacent a distal end of the shank and a second position located a predetermined distance from the upper head, the movement of the lower head from its first position to its second position being sufficient to cause the at least two pre-assembly legs to be folded back upon themselves to thereby extend laterally from the shank to a degree sufficient to secure the retainer within a bore formed in the first object, the first object being captured between the upper head and the at least two me-assembly legs, and the second object being captured between the lower head and the shank fastener.

17. The retainer of claim 16 wherein the at least two pre-assembly legs are biased against the first object when the lower head is in its second position.

18. The retainer of claim 16 wherein the at least two pre-assembly legs are bowed near the middle of their respective lengths when the lower head is in its second position.

19. The retainer of claim 18 wherein the at least two pre-assembly legs are biased against the first object when the lower head is in its second position.

20. The retainer of claim 16 further comprising a retaining mechanism for maintaining the lower head in its second position with respect to the shank.

21. The retainer of claim 20 wherein the retaining mechanism comprises a flexible finger extending laterally from the shank such that as the lower head moves to its second position, the flexible finger is temporarily deflected out of the path of travel of the lower head only to return to its initial position once the lower head has achieved its second position, thereby retaining the lower head in its second position.

22. The retainer of claim 16 wherein the retaining mechanism comprises a catch that extends laterally from the shank of the retainer so as to at least partially block the path of travel of the lower head in its movement to its second position, the lower head and the catch being sufficiently flexible that the lower head may be forced past the catch into its second position, the lower head and the catch being sufficiently rigid so as to maintain the lower head in its second position.

23. The retainer of claim 22 further comprising at least one catch that extends laterally from the shank of the retainer so as to at least partially block the path of travel of the lower head in its movement to its second position, the lower head and the catch being sufficiently flexible that the lower head may be forced past the catch into its second position, the lower head and the catch being sufficiently rigid so as to maintain the lower head in its second position.

24. A part-in-assembly fastener for securing a headliner panel to the interior of a vehicle, the fastener comprising:

an upper head from which extends a shank, the shank having formed in a distal end thereof a shank fastener for securing the part-in-assembly fastener in a bore formed in the second object;

a pair of flexible pre-assembly legs, each of the pair being secured at an upper end thereof to the shank at a predetermined offset distance from the upper head;

a lower head having a generally annular shape with a bore formed through the center thereof, the bore being sized so as to be received over the shank of the part-in-assembly fastener and moveable between a first position in which the lower head is located adjacent the distal end of the shank and a second position located adjacent to the upper ends of the pre-assembly legs, the movement of the lower head from its first position to its second position acting to fold the pair of pre-assembly legs such that when the lower head is in its second position, the pair of pre-assembly legs are biased into contact with the headliner panel to compress the headliner panel between the pre-assembly legs and the head of the part-in-assembly fastener to a degree that maintains the fastener in predetermined attitude with respect to headliner panel and also allows the position of the fastener to be adjusted laterally; and a retaining structure for retaining the lower head in its second position comprising a flexible tab extending laterally from the shank and a catch formed opposite the flexible tab and also extending laterally from the shank, the flexible tab and the catch being constructed and arranged to permit the lower head to move to its second position at which point the flexible tab and the catch will engage respective notches formed into the under surface of the lower head.

25. A retainer for securing a first object to a second object, the retainer being constructed and arranged for pre-assembly with the first object, the retainer comprising:

an upper head from which extends a shank, the shank having a shank fastener for securing the retainer in a bore formed in the second object;

at least one pre-assembly leg, a first end of the at least one pre-assembly leg being secured to the shank of the retainer a predetermined distance from the upper head thereof;

a lower head constructed and arranged to be received over the shank, the lower head being secured to a second end of the at least one pre-assembly leg, the lower head being moveable along the shank of the retainer between a first position adjacent a distal end of the shank and a second position located a predetermined distance from the upper head, the movement of the lower head from its first position to its second position being sufficient to cause the at least one pre-assembly leg to extend generally laterally from the shank; and a retaining mechanism for maintaining the lower head in its second position with respect to the shank, wherein the retaining mechanism comprises a flexible finger extending laterally from the shank such that as the lower head moves to its second position, the flexible finger is temporarily deflected out of the path of travel of the lower head only to return to its initial position once the lower head has achieved its second position, thereby retaining the lower head in its second position.

26. The retainer of claim 25 further comprising at least one catch that extends laterally from the shank of the retainer so as to at least partially block the path of travel of the lower head in its movement to its second position, the lower head and the catch being constructed and arranged such that the lower head may be forced past the catch into its second position, the catch acting to maintain the lower head in its second position.

27. A retainer for securing a first object to a second object, the retainer being constructed and arranged for pre-assembly with the first object, the retainer comprising:

an upper head from which extends a shank, the shank having a shank fastener for securing the retainer in a bore formed in the second object;

at least one pre-assembly leg, a first end of the at least one pre-assembly leg being secured to the shank of the retainer a predetermined distance from the upper head thereof;

a lower head constructed and arranged to be received over the shank, the lower head being secured to a second end of the at least one pre-assembly leg, the lower head being moveable along the shank of the retainer between a first position adjacent a distal end of the shank and a second position located a predetermined distance from the upper head, the movement of the lower head from its first position to its second position being sufficient to cause the at least one pre-assembly leg to extend generally laterally from the shank; and a retaining mechanism for maintaining the lower head in its second position with respect to the shank, wherein the retaining mechanism comprises a catch that extends laterally from the shank of the retainer so as to at least partially block the path of travel of the lower head in its movement to its second position, the lower head and the catch being constructed and arranged such that the lower head may be forced past the catch into its second position, the catch acting to maintain the lower head in its second position.

* * * * *